United States Patent [19]

Creech

[11] 4,383,870
[45] May 17, 1983

[54] APPARATUS AND METHOD FOR CUTTING HOLES IN STEEL PLATES

[76] Inventor: Clyde W. Creech, 2243 W. South Mountain Ave., Phoenix, Ariz. 85041

[21] Appl. No.: 303,538

[22] Filed: Sep. 18, 1981

Related U.S. Application Data

[62] Division of Ser. No. 113,471, Jan. 21, 1980, Pat. No. 4,330,110.

[51] Int. Cl.$^3$ ............................ B23K 7/02; B23K 7/10
[52] U.S. Cl. ..................................................... 148/9 R
[58] Field of Search ................. 148/9 R, 9 C; 266/67, 266/58, 69, 62

[56] References Cited

U.S. PATENT DOCUMENTS 3,387,375  6/1968  Nowotny .............................. 266/62
4,012,027  3/1977  Hooper ................................ 266/58

FOREIGN PATENT DOCUMENTS

356062  10/1972  U.S.S.R. ................................ 266/70

Primary Examiner—W. Stallard
Attorney, Agent, or Firm—Cahill, Sutton & Thomas

[57] ABSTRACT

Single or ganged cutting torches for steel plates preheat the center of each hole to be cut prior to any displacement of the torches. On completion of the preheating, the torches are laterally repositioned in correspondence with the common radius of the holes to be cut. Simultaneously, the torches begin to cut and motive means initiates and maintains circular movement of each of the torches commensurate with the circumference of the holes to be cut. Positioning means for locating each of the torches in the X-axis and for translating the torches en masse in the Y-axis are disclosed. Means for accommodating bowing of the steel plate along with means for setting the torches to cut various diameter holes at any bevel angle are described.

19 Claims, 16 Drawing Figures fig. 5 fig. 6 fig. 7 fig. 11 fig. 12 fig. 13

APPARATUS AND METHOD FOR CUTTING HOLES IN STEEL PLATES

This is a division of application Ser. No. 113,471, filed Jan. 21, 1980, now U.S. Pat. No. 4,330,110.

The present invention relates to cutting torches and, more particularly, apparatus for controlling movement of one or ganged cutting torches with respect to a workpiece.

In most manufacturing facilities producing uniformly shaped, sized or apertured workpieces, machine controlled apparatus is employed to position and guide one or ganged cutting torches in order to insure repetitively uniform workpieces. U.S. Pat. No. 2,517,622 describes a set of ganged cutting torches for severing segments from a sheet of steel. U.S. Pat. No. 2,533,311 is directed to ganged cutting torches for cutting tapered or untapered workpieces of circular cross-section. U.S. Pat. No. 4,030,711 illustrates a plurality of cutting torches for simultaneously cutting circles in a sheet of steel. In the apparatus described in the above identified patents, all of the cutting torches are ganged and none of them maintain a constant orientation to the axis of rotation. With this arrangement of the cutting torches, bevels can only be cut along a straight cut line and all curved cuts must have edges vertical to the major plane of the workpiece.

It is therefore a primary object of the present invention to provide ganged cutting torches for cutting straight or constant beveled edges irrespective of the degree of curvature of the cut line.

Another object of the present invention is to provide a means for individually rotating each torch of ganged cutting torches about an axis of rotation simultaneous with rectilinear translation of the ganged cutting torches.

U.S. Pat. No. 3,547,424 is directed to a post mounted articulated support structure for a cutting torch which translates the cutting torch in either of two axis in a workpiece in accordance with a predetermined program. No provision exists for maintaining a constant bevel angle when a curved line is being cut.

Still another object of the present invention is to provide apparatus for controlling the movement of a cutting torch which maintains a constant beveled angle during translation of the cutting torch along a circular path.

Yet another object of the present invention is to provide means for cutting a constant bevel angle along a circular cut with an individual cutting torch or with ganged cutting torches.

U.S. Pat. Nos. 3,351,332, 3,591,156 and 3,701,515 are directed to various devices for cutting circular holes in a workpiece wherein a cutting torch rotates about a point physically keyed to a predetermined mark upon the workpiece and representative of the center of the circle to be cut. Means are also disclosed in U.S. Pat. Nos. 3,591,156 and 3,701,515 for preventing twisting of the gas lines to the cutting torch while the torch rotates about the point. Prior to operation of any of the above described devices, the workpiece must be marked to locate the center point of the circle and the torch supporting apparatus must be physically repositioned commensurate with the mark to engage a pointer with the mark. Thereafter, cutting of the aperture may commence. Where the workpiece is to be dimpled to receive the pointer, a presupposition must be made that the workpiece is soft enough to be dimpled.

Yet another object of the present invention is to obviate the need for individually marking the center of any aperture to be cut in a workpiece.

A further object of the present invention is to eliminate the need for physically keying an element of a cutting torch to a predetermined location upon the workpiece.

A yet further object of the present invention is to eliminate the need to physically index the workpiece directly with a cutting torch.

U.S. Pat. Nos. 3,188,069 and 3,747,911 are directed to support apparatus for a cutting torch which support apparatus is mounted upon the workpiece itself and indexed thereto by a pointer positionally aligned with a mark upon the workpiece. Necessarily, the workpiece must be of a certain minimum size to accommodate the cutting torch support apparatus.

It is therefore a further object of the present invention to provide positioning apparatus for a cutting torch which is useable for any sized workpiece.

U.S. Pat. No. 3,713,635 is directed to positioning apparatus for a cutting torch which is clamped to a workpiece. The necessity for clamping the apparatus to the workpiece requires the workpiece to be larger than a predeterminable minimal size. Moreover, the requirement exists that the workpiece be supported in such a manner as to accommodate the clamps.

A still further object of the present invention is to provide apparatus for supporting a cutting torch which apparatus is independent of the workpiece supporting means.

U.S. Pat. No. 4,021,025 describes a cutting torch supporting apparatus which is secured to a workpiece by magnets. The apparatus must be located with respect to the workpiece by aligning a pointer extending therefrom with a mark previously located upon the workpiece.

The use of magnets, if strong enough, will maintain a cutting torch supporting apparatus but the requisite strength for the magnets is proportional to the degree of difficulty in locating the apparatus in a predetermined position upon the workpiece.

A still further object of the present invention is to provide a means for indexing a cutting torch to each of a plurality of positions upon a workpiece without direct reference to the workpiece itself.

A plurality of cutting torch support apparatus for various defined requirements, sold under the mark "Bug-O Systems", are manufactured by the Weld Tooling Corporations. Each of these apparatus have a parallel in one of the above identified patents.

All of the above described prior art systems initiate cutting by the torch on the actual cut line itself. This produces a channel or scarring on the cut line and precludes a smooth surfaced cut.

It is therefore a yet further object of the present invention to develop a smooth surfaced beveled cut in a workpiece.

In ore treatment plants, crushers are used to reduce the size of the ore pieces prior to further treatment. Such a crusher includes a large diameter cylinder having an interior lining of a plurality of replaceable liner plates. The size and thickness of these plates may vary, depending upon the size of the crusher and the type of ore being crushed. In example, the liner plates may be ½ inch thick, 13 inches in width and 37 inches in length or one inch thick, 18 inches in width and 26 inches in length. Because of the very abrasive nature of the ore coming in contact with the liner plates, the liner plates are made of steel identified as REM-500 which is next to the hardest steel known or of steel identified as VORTEN which is the hardest steel known.

Each of these liner plates is retained in place by countersunk bolts threadedly engaging a receiver of the liner plate support structure. Countersinking of the bolts is necessary to preclude wear of the bolt head which would render it extremely difficult to loosen the bolts and replace the liner plates. It is therefore necessary to form countersunk holes in each liner plate at predetermined locations uniform throughout all of the plates to render them fungible with respect to one another.

Because of the hardness of the steel used for the liner plates, drilling of the holes is totally impractical. Therefore, the holes must be cut with a cutting torch. The use of any conventional apparatus for supporting the cutting torch which requires a dimple formed in the surface of the liner plate by a counter point as an index is not practical because the counter point could shatter before the dimple is formed. To use prior art torch supporting apparatus which is magnetically attached to or clamped to a liner plate to locate the cutting torch with respect to a marked reference point is possible but extremely high labor costs per cut hole result because of the substantial amount of time necessary in aligning the apparatus and attaching it to the plate. Moreover, the requirement for such manual aligning increases the possibility of slightly misaligned holes. Should any liner plates with out-of-line or out-of-position holes be sent to an ore treatment facility, substantial and extremely expensive down time will result pending the arrival of further replacement liner plates as conventional tools can only be employed at great expense to force the fit of the liner plates or enlarge the holes to obtain mating of the countersunk bolts with the threaded receivers.

The present invention describes apparatus for cutting one or more counterbored holes through such liner plates simultaneously without the need for marking or dimpling an index for each of the holes and provides an unscarred beveled surface for receiving the bolt head. The apparatus includes one or more cutting torches mounted upon a translatable supporting bar, the translation of which is commensurate with the radius of the counterbore. Each cutting torch is mounted rotatable about an axis of rotation without fouling the gas lines attendant thereto. Means are incorporated in an underlying workpiece supporting platform for indexing each workpiece with respect to a single or ganged cutting torches. The latter being positionable along a scale upon the supporting bar, which scale is keyed to the workpiece indexing means. Translation of the supporting bar along the Y-axis for each of one or more distances without skewing of the supporting bar is also provided. Since it is not uncommon for a workpiece to be slightly bowed, means are provided for altering the height of the cutting torch to accommodate such bowing and provide correctly sized and located holes. Means are also provided for adjusting the cutting torches to differently sized holes, to accommodate different plate thicknesses and to accommodate a range of bevel angles.

In operation, the cutting torches are placed in a heating mode to preheat the center of the hole to be cut. After a predetermined time, the torches are switched to a cutting mode. Simultaneously, each of the torches begins to rotate about its respective axis and the supporting bar is translated for a distance commensurate with the radius of the holes to be cut. The resulting cut represents a spiral melding smoothly into a beveled edge defining the perimeter of the hole extending through the plate.

The present invention may be described with further specificity and clarity with reference to the following drawings, in which.

Figure 1:
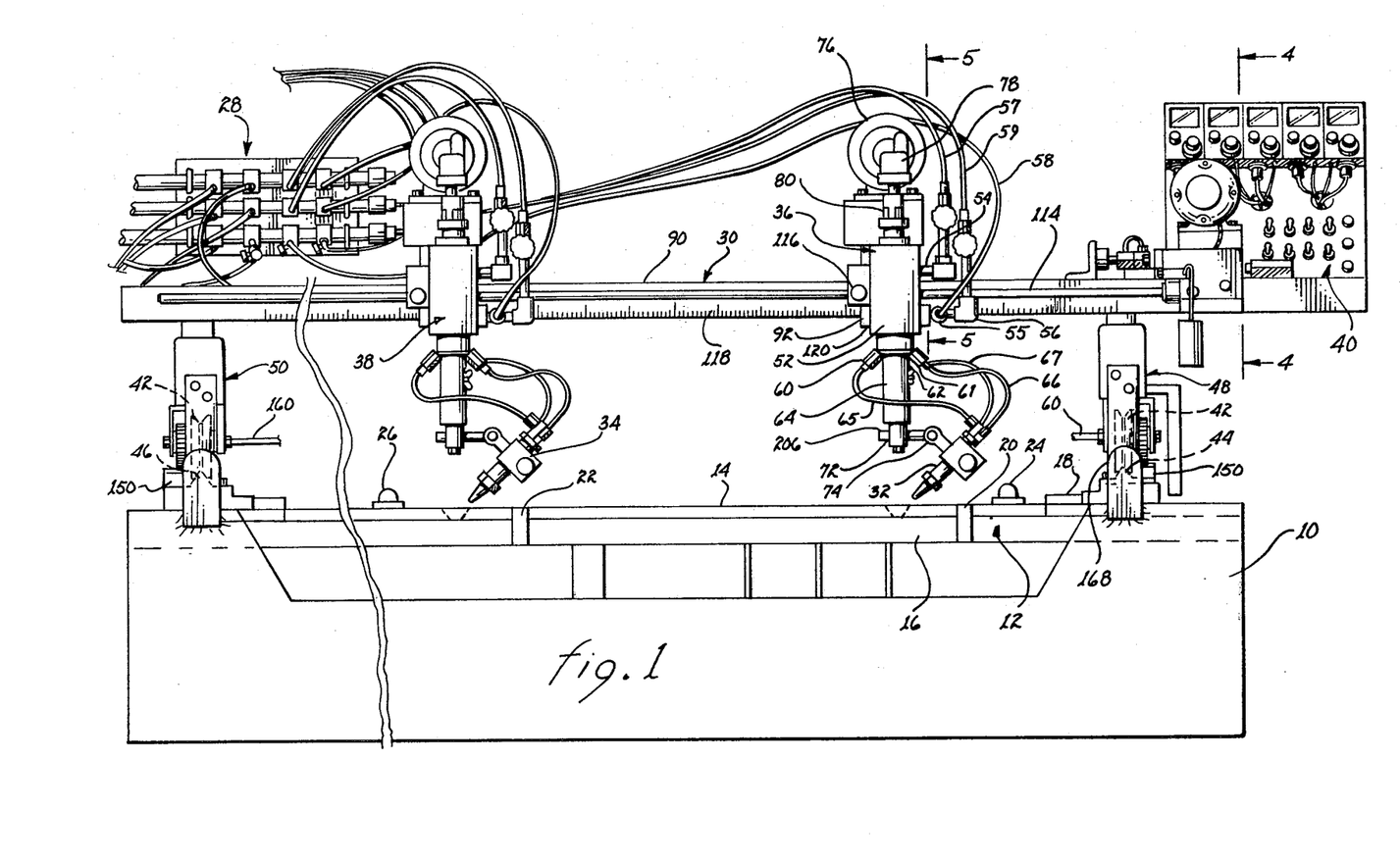
FIG. 1 is an elevational view of cutting torches located above a workpiece by a supporting superstructure.

FIG. 1 illustrates the apparatus for supporting, operating and transporting a ganged pair of cutting torches with respect to an indexed workpiece. A robust frame 10 includes a platform 12 upon which a workpiece 14 is placed. The platform may include a plurality of laterally supported rails 16 to give adequate support and yet provide open bays directly beneath any holes to be cut in the workpiece to prevent damage to the platform by the cutting torches. Workpiece 14 is indexed to platform 12 by index means, such as block 18 disposed along one edge of the workpiece and blocks 20, 22 disposed along another edge of the workpiece. Maintenance of the workpiece adjacent the blocks may be effected by clamps 24, 26.

A superstructure 30 supports cutting torches 32, 34 along with the rotational drive means 36, 38 associated with each torch and control panel 40. The superstructure is translatable in the Y-axis (rearwardly and forwardly) be grooved wheels collectively referenced by numeral 42, engaging rails 44 and 46, which rails are rigidly attached to frame 10. The complementary pairs of the grooved wheels are mounted within depending leg sections 48, 50, and rotationally locked together by a common journal. The leg sections also include the mechanical positioning means for accurately locating the superstructure in the Y-axis and locking means for maintaining the superstructure in place.

A manifold 28, which may be attached to a superstructure 30 or to frame 10 provides oxygen at two different pressures and acetylene to the torches through discrete flexible hoses and attendant couplings. Valve means are also incorporated attendant the manifold and under control of the switches on the control panel.

Rotational drive means 36 will be described in detail, but it is to be understood that rotational drive means 38 is a duplicate therof. The rotational drive means includes a rotary coupling 52 having a block 53 for receiving inputs 54, 55, 56 connected to three discreet sources of gas by flexible couplings 57, 58 and 59, respectively. Outputs 60, 61 and 62 are mounted upon a rotatable spindle 64 and are in fluid communication with the respective ones of flexible lines 65, 66 and 67. Spindle 64 supports cutting torch 32 through positioning means 72 which permits lateral repositioning of the cutting head with respect to the axis of rotation of the spindle. The positioning means also includes angular adjustment means 74 for setting the angle of the cutting torch at any angle within a given range of angles. Electric motive means 76 is actuatable to rotate spindle 64 through a gear box 78 and coupling 80.

From the above description, it will become apparent that rotational drive means 36 may be actuated to effect rotational movement of cutting torch 32 about the axis of rotation of spindle 64 to cut a hole having any bevel angle within a range of angles and of any radius within a range of radii. Moreover, fouling of the flexible lines conveying the various gases to the cutting torch will not result irrespective of the number of consecutive revolutions of the cutting torch in a given direction.

The mounting of each of the rotational drive means upon super structure 30 will be described with joint reference to FIGS. 1 and 5. Super structure 30 includes a rigid robust square tube 90 which serves as a supporting bar and bears the loads placed thereon without any perceptible flexing. The tube is rigidly attached to leg sections 48 and 50 (see also FIG. 4) by nut and bolt means. A member 92 extends along two joined orthogonal sides of tube 90 and is in contact therewith through rollers 94 and 96, which rollers permit relatively easy translation of the member along the tube. A further roller 98 is in frictional contact with the rear vertical surface of tube 90. This roller is mounted upon a shaft 100 journaled within member 92 and supporting a handwheel 102. Through the restraints provided by these rollers against rotation of member 92 about the longitudinal axis of tube 90, such rotational movement of the member is precluded. A pedestal 104 is attached to member 92 and supports electric motive means 76. Rotary coupling 52 is attached to member 92 directly by bolt 106 and by bolt 108 engaging arm 110 extending from the rotary coupling. Thereby, rotational drive means 36 is rigidly and robustly attached to member 92.

The member also includes an apertured ear 112 for engaging a penetrating rod 114. A thumb screw 116 is employed to lockingly engage the rod with the ear. As will be described in further detail below, rod 114 is translated along its longitudinal axis to reposition each of the cutting torches secured thereto in response to relative movement between member 92 and tube 90 along the longitudinal axis of the tube.

As illustrated in FIG. 1, a scale 118 is attached to tube 90 along its front side. An index 120, which may be the edge of member 92, cooperates with the scale to locate the axis of rotation of spindle 64 the indicated distance from the edge of the workpiece bearing against block 18. Thereby, the location of the holes to be formed in the workpiece with respect to the X-axis are settable by loosening thumb screw 116 and repositioning rotational drive means 36 (and 38) to the desired value. Such repositioning may be effected by manually turning handwheel 102 to bring about rotation of roller 98 along the engaged side of tube 90. The friction intermediate the roller and the tube will result in movement of member 92 and the elements supported thereon. Thereby, very accurate indexing of the rotational drive means along scale 118 may be accomplished. Thereafter, the rotational drive means is locked in place with respect to rod 114 by tightening thumb screw 116. It is to be understood that other indexing means may be employed in the alternative.

Figures 4, 4A:
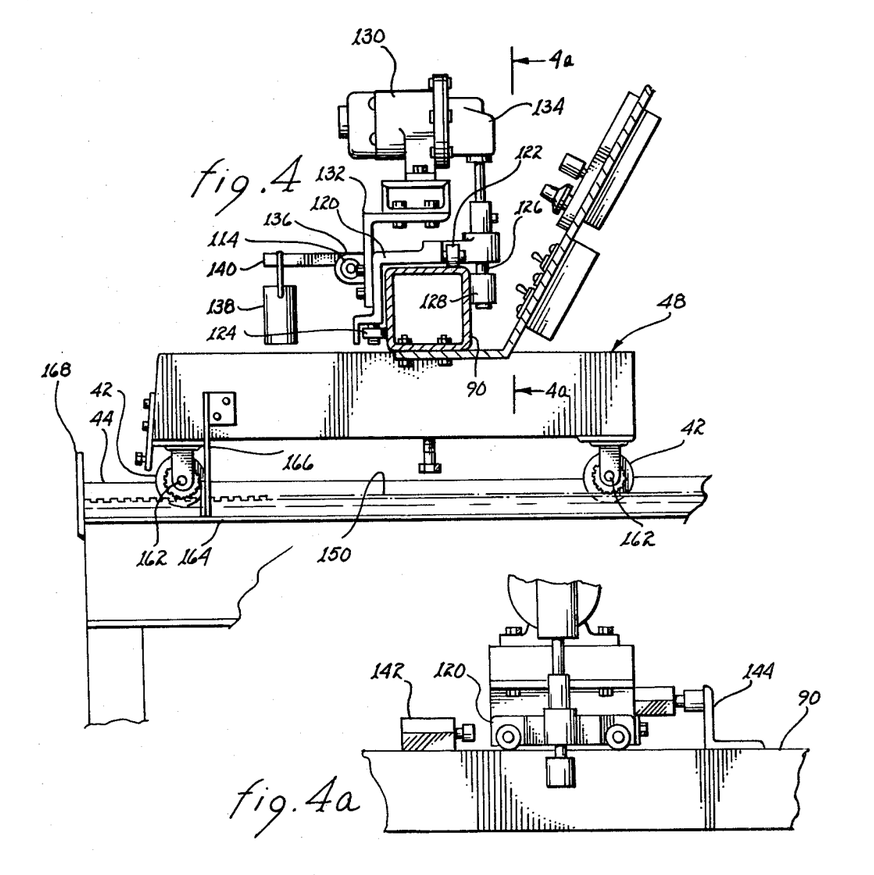
FIG. 4 is a cross-sectional view taken along lines 4—4, as shown in FIG. 1.
FIG. 4a is a cross-sectional view taken along lines 4a—4a, as shown in FIG. 4.
Figures 5, 6, 7:
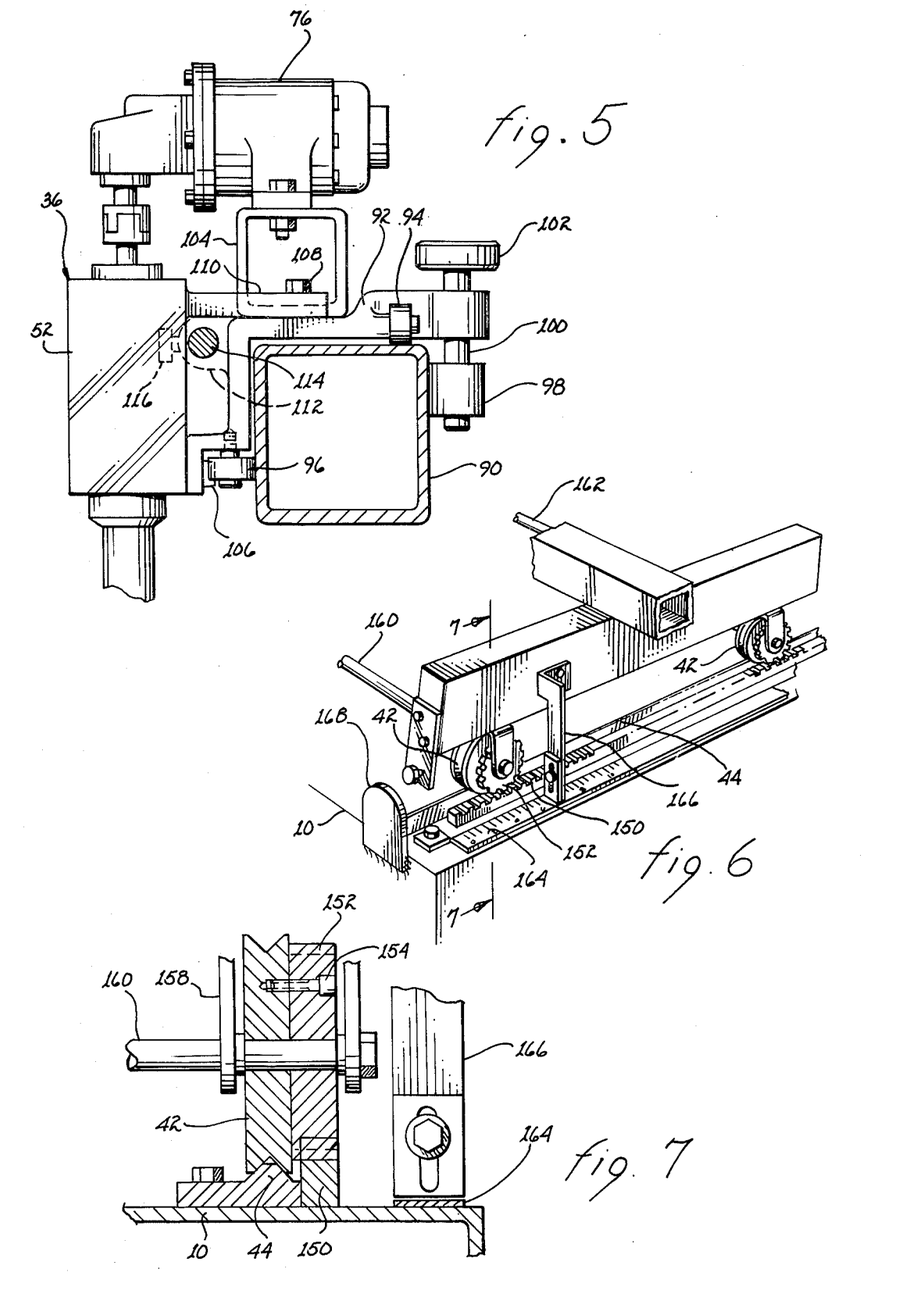
FIG. 5 is a cross-sectional view taken along lines 5—5, as shown in FIG. 1.
FIG. 6 is a partial isometric view illustrating a part of the transport apparatus.
FIG. 7 is a cross-sectional view taken along lines 7—7, as shown in FIG. 6.

Referring jointly to FIGS. 1, 4 and 4a, the means for translating the cutting torches in the X-axis during the cutting of the holes will be described. A member 120, similar in configuration to member 92, is supported upon tube 90 by rollers 122 and 124. The member supports a journaled shaft 126. A roller 128 is fixedly attached to one end of the shaft and bears against the rear surface of tube 90. Electric drive means 130 is mounted upon a pedestal 132 secured to and extending upwardly from member 120. The other end of shaft 126 is operatively attached to the armature of electric drive means 130 through a gear box 134. An apertured ear 136 extends from member 120. Rod 114 is fixedly attached to the ear to preclude translation of the rod along its longitudinal axis with respect to the ear. A counterweight 138 is suspended from arm 140 extending from member 120 to bias roller 128 against tube 90 which bias and hence frictional engagement may be varied by altering the weight of the counterweight or its position along arm 140.

From the above description, it will become evident that upon actuation of electric drive means 130, roller 128 is caused to rotate. Rotation of this roller, due to its frictional engagement with the adjacent side of tube 90, will bring about translation of member 120 along the longitudinal axis of tube 90. Such translatory motion results in equivalent translatory motion of rod 114. As described earlier, rod 114 is fixedly secured to each of the rotational drive means and the rotational drive means will be translated in ganged fashion along with translation of member 120. As illustrated particularly in FIG. 4a, limit stops 142 and 144 extend from tube 90 to limit the translational movement of member 120.

Translation of superstructure 30 in the Y-axis will be described with joint reference to FIGS. 1, 4, 6 and 7. A toothed rack 150 is mounted upon frame 10 adjacent and parallel to rail 44 on the right-hand side of the frame, as viewed in FIG. 1. A similar toothed rack 150 is mounted adjacent rail 46 on the left hand side of the frame. A sprocket 152 is concentrically mounted to each of grooved wheels 42 through countersunk Allenhead bolts 154. The sprocket engages the teeth in rack 150. The combination of grooved pulley and sprocket is rotatably mounted via a shaft within clevis-like keeper 158 extending downwardly from leg section 48. While the above description has been primarily directed to the left front grooved wheel and sprocket combination, it is to be understood that each of the remaining grooved wheel and sprocket combinations are similarly constructed and operate in the same manner. To prevent the skewing of superstructure 30, a shaft 160, lockingly engages each of the opposed front grooved wheel and sprocket combinations to preclude independent rotation therebetween. Similarly, a further shaft 162 interconnects the opposed rear grooved wheel and sprocket combinations to preclude independent rotation therebetween.

The positioning of super structure 30 in the Y-axis must be set with reference to the indexed workpiece and the location of the holes to be formed therein. A scale 164 is mounted upon frame 10 parallel to rack 150 (see FIG. 6). An index 166 is attached to and extends downwardly from leg section 48 into close proximity with the scale. The positional relationship of the index to the leg section is a function of the relative spacing between the indexed workpiece, the cutting torches, tube 90 and the location of the tube with respect to the leg section. Locking means (not shown specifically) is employed to lock the superstructure in the Y-axis. Stops, such as stop 168 may be employed to prevent inadvertent derailment of the grooved wheels from the supporting rails.

Figures 8, 9, 10:
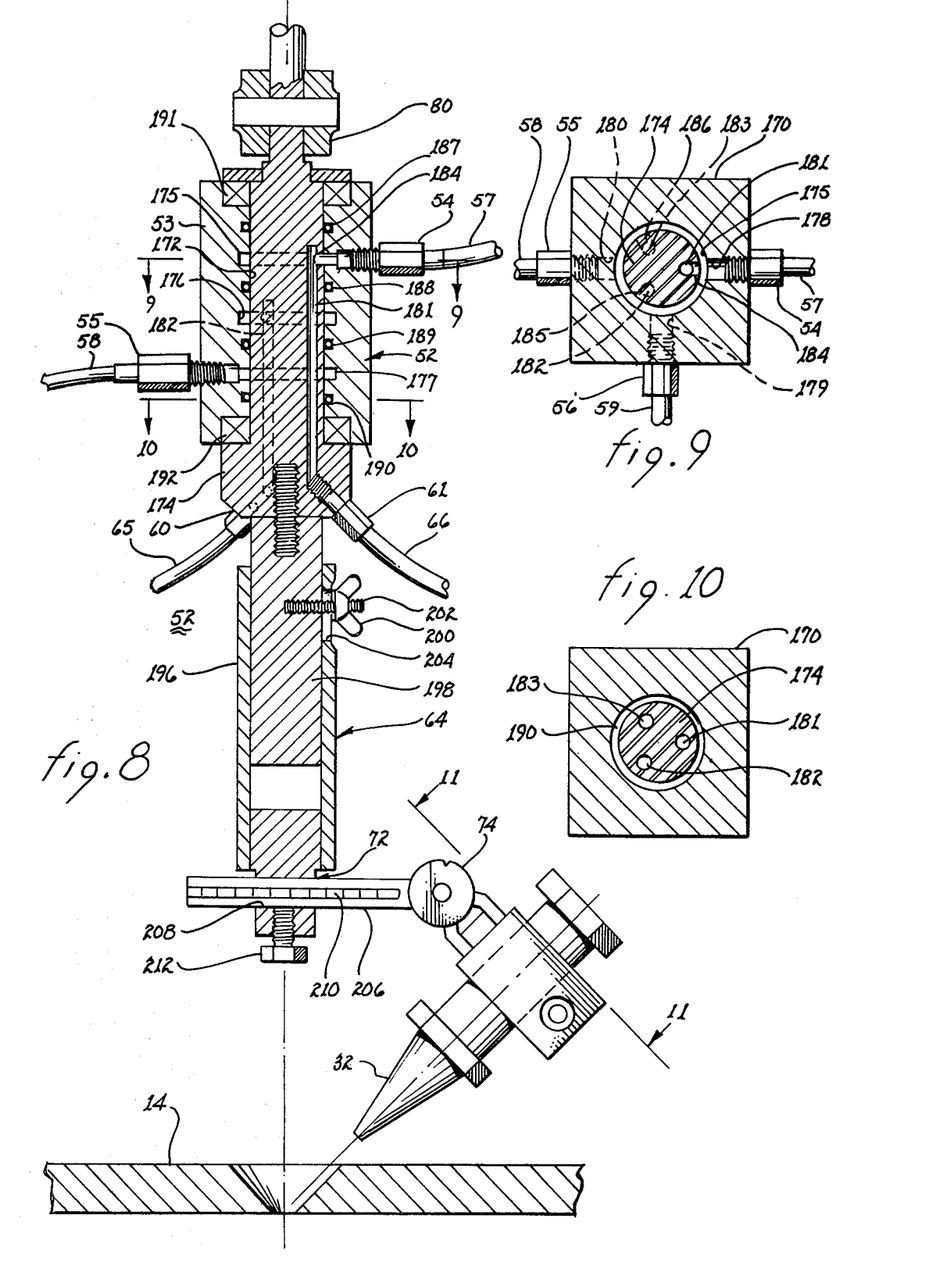
FIG. 8 is a cross-sectional view of the rotary couplings supporting the cutting torch.
FIG. 9 is a cross-sectional view taken along lines 9—9, as shown in FIG. 8.
FIG. 10 is a cross-sectional view taken along lines 10—10, as shown in FIG. 8.
Figure 11:
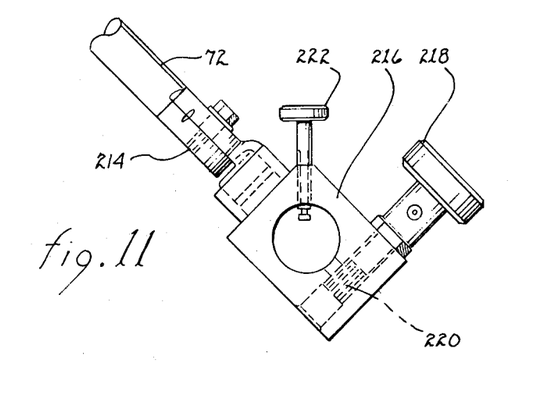
FIG. 11 is an end view taken along the lines 11—11, as shown in FIG. 8.

Referring jointly to FIGS. 8, 9 and 10, rotary coupling 52 will be described. A block 53 includes a passageway 172 formed therein for rotatably receiving section 174 of spindle 64. The block includes a plurality of internal annular grooves 175, 176 and 177 in fluid communication with inlets 54, 56 and 55 via partially threaded passageways 178, 179 and 180, respectively. Three longitudinally aligned passageways 181, 182 and 183 are disposed within section 174. Each of these passageways is in fluid communication with one of the annular grooves through the respective one of lateral passageways 184, 185 and 186. Gas leakage intermediate the annular grooves is prevented by a plurality of O-rings 187, 188, 189 and 190 disposed within individual annular grooves in block 53 and bracketing annular grooves 175, 176 and 177. To facilitate rotation intermediate section 174 and block 53, bearings 191 and 192 are employed.

Outputs 60, 61 and 62 extending from section 174 are in fluid engagement with passageway 183, 182 and 181, respectively. Thereby, the gases from flexible lines 57, 58 and 59 are transmittable to respective ones of flexible lines 65, 66 and 67 without entangling the lines when the cutting torch is rotated about the rotational axis of the rotational drive means.

To accommodate height adjustment of torch 32, spindle 64 includes a slidably adjustable sleeve 196 longitudinally adjustable with respect to rod 198 by means of a thumb screw 200 threadedly engaging a shaft 202 extending through a slot 204 in the sleeve. The lower end of the sleeve is affixed to and supports positioning means 72; the positioning means includes a slot 208 disposed therein for receivingly engaging bar 206. The bar includes a scale 210, which scale, in combination with an index such as an edge of the positioning means, provides an indication of the lateral extension of cutting torch 32 from the axis of rotation. A thumb screw 212 retains the bar secured within slot 208.

Referring jointly to FIGS. 8, 11, 12 and 13, the apparatus for securing and adjusting cutting torch 32 will be described. The cutting angle of the cutting torch is established by the angle set upon tightening of the joint at angular adjustment means 74 intermediate bar 206 and collar 216. The height of the tip of the torch above the surface of the workpiece is variable by means of a handwheel 218 turning a ratchet 220 frictionally cooperating with the barrel of the cutting torch. Once the position of the cutting torch within the collar has been established, it is secured in place by thumbscrew 222 extending through the collar into frictional contact with the barrel of the cutting torch.

Figures 12, 13:
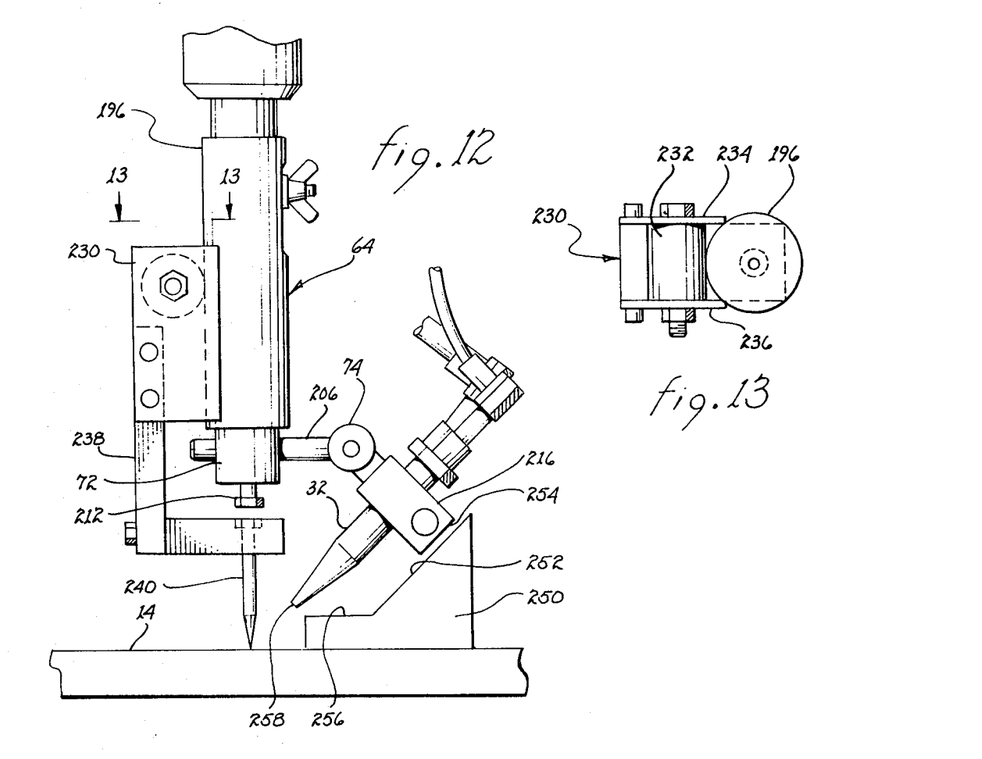
FIG. 12 is a partial elevational view illustrating indexing of the cutting head to the workpiece.
FIG. 13 is an end view taken along lines 13—13, as shown in FIG. 12.

To positionally align the axis of rotation of each rotational drive means with the center of any hole to be cut, tool 230 is employed. The tool includes a magnet 232 disposed intermediate plates 234 and 236. As particularly illustrated in FIG. 13, the positional relationship between the magnet and the plates is such as to partially receive a section of sleeve 196 intermediate the plates in physical contact with the magnet and the edges of the plates. Thereby, the tool in repetitively and accurately alignable with the spindle. An L-shaped member 238 extends downwardly and laterally and supports a downwardly extending pointer 240. The physical location of pointer 240 with respect to the laterally extending part of L-shaped member 238, in combination with the positional relationship of magnet 232 to sleeve 196 is such as to align the axis of pointer 240 with the axis of rotation of spindle 64. It may be noted that the vertical height of tool 230 may be varied to accommodate different height positions of spindle 64. It will therefore be evident that the rotational drive means supporting spindle 64 may be readily set through use of the tool to obtain correct alignment with the center of the hole to be cut.

Usually, when a series of beveled holes are to be cut, as in the liner plates discussed above, a large number of constant diameter holes having constant bevel angles are needed. In such cases, a jig 250 is employed, which jig has a sloping side 252 commensurate with the bevel angle to be cut. To set and periodically check the angle of cutting torch 32, side 252 of the jig is brought against side 254 of collar 216, which side is parallel to the axis of the cutting torch. Any variation between side 254 and side 252 would indicate angular misalignment and require resetting of the angular adjustment means. To insure that cutting torch 32 is at the proper height above the workpiece (and thereby accommodate bowing of the workpiece) to obtain optimum cutting capability of the emitted flame, a platform 256 is provided in jig 250. The height of platform 256 defines the height of tip 258 of cutting torch 32 above the workpiece. Thereby, an initial setting and subsequent rechecks of the correct height of tip 258 can be accomplished by sliding platform 256 thereunder. If the tip is to high, operation of ratchet 220 through handwheel 216 readily lowers (or raises) the tip and it may be relocked in the altered position by thumbwheel 222.

Figure 2:
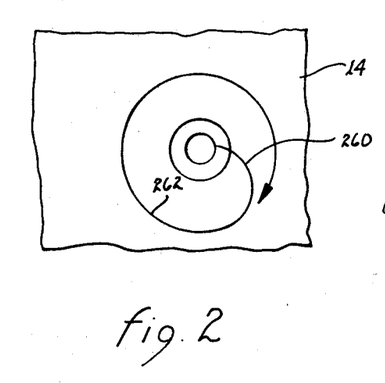
FIG. 2 illustrates the configuration of the cut.
Figure 3:
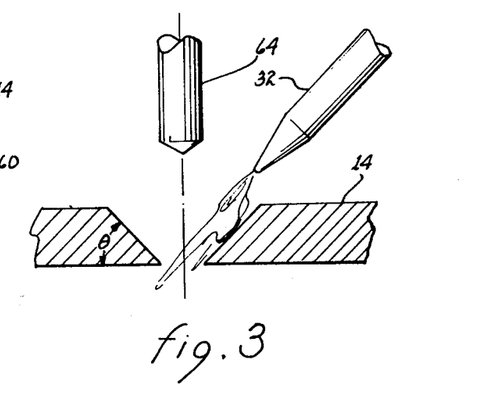
FIG. 3 is a cross-sectional view of a cut hole.

Referring to FIGS. 1, 2 and 3, the path defined by the cutting torch during operation of the present invention will be described. Two of the flexible couplings conveying gas to each of the torches contain oxygen; in one of the lines, the oxygen is approximately 30 psi while in the other line, the oxygen is at a pressure in the range of 65 to 85 psi. The third line conveys a gas such as acetylene at approximately 7 to 9 psi. After workpiece 14 has been placed upon platform 12 and properly indexed and assuming the rotational drive means has been located at the appropriate X and Y coordinates, one of the switches on control panel 40 is actuated. Thereupon, acetylene and low pressure oxygen will flow from the cutting torches and the flame, after ignition of the gases, will heat the center of the holes to be cut. After sufficient heat buildup has been achieved, a further switch is actuated to introduce high pressure oxygen to the cutting torches. The high pressure oxygen, in combination with the acetylene, begins to make a cut through the workpiece. Simultaneously, electric drive means 130 is energized which results in translation of rod 114 to reposition each of the attached ganged rotational drive means along the X-axis for a distance equivalent to the radius of the hole to be cut. Also simultaneously, the electric motive means of each rotational drive means is energized to rotate the respective spindles resulting in commensurate rotation of the attached cutting torch.

The cut actually made is illustrated in FIG. 2. The simultaneous lateral translation of the rotational drive means coupled with rotation of spindle 64 results in a spiral cut 260. The spiral terminates commensurate with engagement of member 120 (see FIG. 4a) with limit stop 142 which prevents further translation of rod 114 and further translation of the ganged rotational drive means. Thereafter, the continuing rotation of the cutting torch due to the continuing actuation of the electric motive means produces a circular cut 262 at a bevel angle θ (see FIG. 3) commensurate with the angle at which the torch is set. By control signals established through circuitry and apparatus forming a part of the control panel, the deactuation of electric motive means 76 will occur on completion of cut 262.

Since the cut is not initiated along cut 262, the final beveled surface, the scarring or gouging attendant prior art devices will not result. Therefore, the surface of the beveled edge is extremely smooth and needs no finishing.

On completion of the various cut holes in workpiece 14, it may, in some cases, be prudent to size the beveled hole at the apex. To effect sizing, along with removal of any slag which may be weakly attached thereto, a bolt or other reamer of appropriate dimension may be driven through the cut. Preferably, such sizing is performed while the workpiece materials adjacent the hole is in a semi-molten state.

Figures 14, 15:
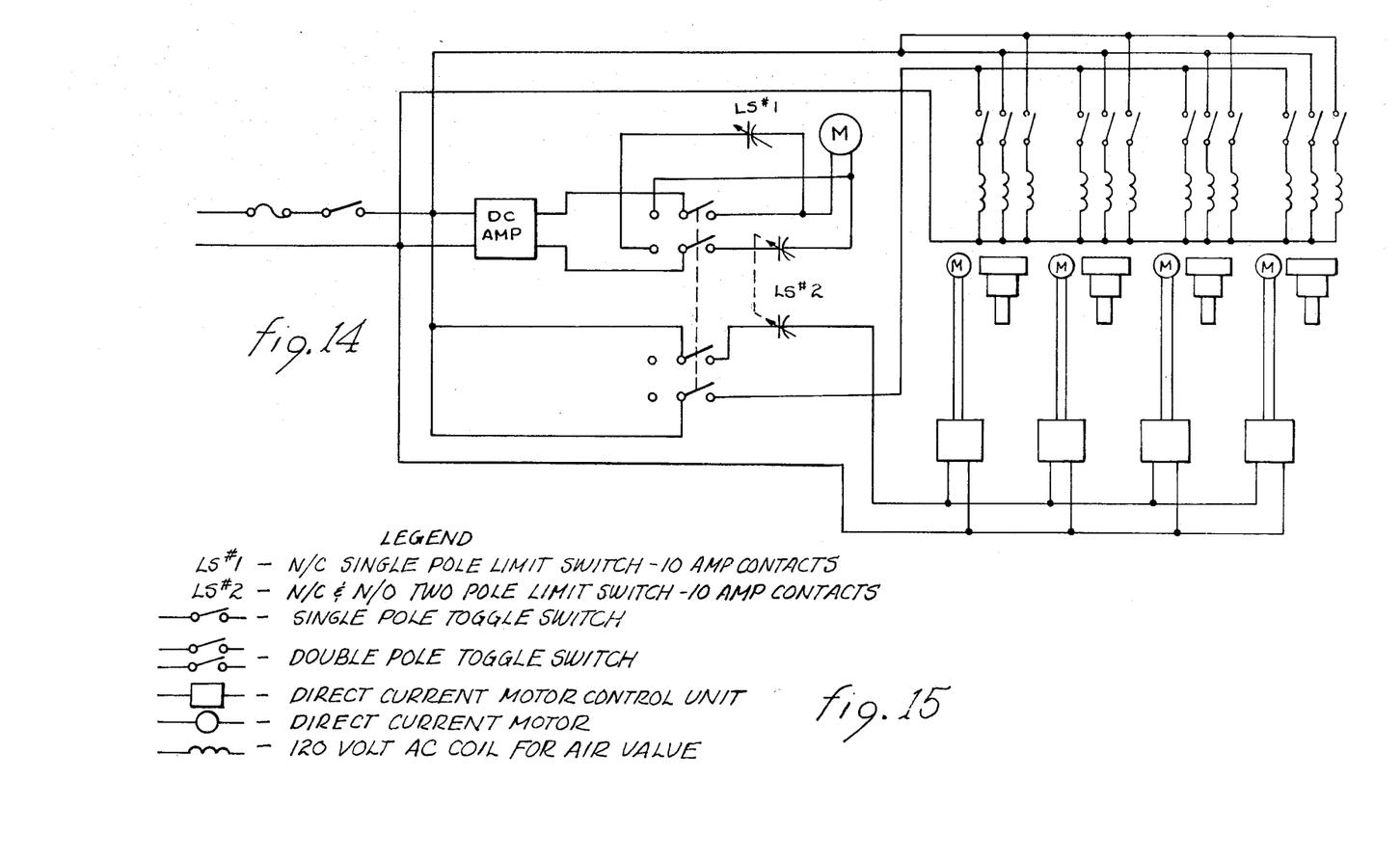
FIG. 14 is a schematic diagram of the control circuitry.
FIG. 15 is a legend in reference to FIG. 14.

Referring to FIG. 14, there is illustrated a representative schematic for the present invention wherein three rotational drive means are ganged. The details and operation of the schematic need not be expounded upon as the operation thereof will be evident to those skilled in the art of control systems when reference is made to the legend identified as FIG. 15.

While the present invention is structured to cut holes in steel plates, it may also be used for other purposes without any structural modifications. In example, a sheet of steel may be placed upon the platform and cut into a plurality of pieces, such as the liner plates. The cutting attendant thereto is accomplished in one direction by translating the superstructure in the Y-axis. The cutting in the other direction is accomplished by translating the cutting torches along tube 90 in the X-axis.

Moreover, it is to be understood that the liner plates can be cut from a common sheet of steel and approximately apertured without the need for any ancillary equipment and without the need for handling except to place the sheet of steel on the platform and remove the finished liner plates.

While the principles of the invention have now been made clear in an illustrative embodiment, there will be immediately obvious to those skilled in the art many modifications of structure, arrangement, proportions, elements, materials, and components, used in the practice of the invention which are particularly adapted for specific environments and operating requirements without departing from those principles.

I claim:

1. A method for cutting an aperture in a workpiece with a cutting torch, said method comprising the steps of:
   (a) preheating the workpiece central to the aperture to be cut;
   (b) initiating cutting of the aperture by the cutting torch at a point within the perimeter of the aperture and maintaining cutting of the aperture until the perimeter of the aperture has been cut;
   (c) translating the cutting torch rectilinearly for a specified distance;
   (d) rotating the cutting torch by advancing the cutting torch along a circular path and simultaneously maintaining the cutting torch in fixed orientation with respect to radials of the aperture to be cut during cutting along the perimeter of the aperture, said advancing step being initiated commensurate with initiation of said translating step;
   (e) terminating said translating step when the cutting torch has been translated the specified distance; and
   (f) continuing said rotating step until the perimeter of the aperture has been cut.

2. The method as set forth in claim 1 wherein said translating step includes the step of positioning the cutting torch lateral to the center of the circular path of the cutting torch commensurate with the perimeter of the aperture to be cut.

3. The method as set forth in claim 1 further including the step of adjusting the angle of the cutting torch in a plane radial to the circular path and commensurate with the bevel angle of the aperture to be cut.

4. The method as set forth in claim 3 further including the step of adjusting the height of the cutting torch above the workpiece commensurate with the thickness of the workpiece, the size of the aperture to be cut and the bevel angle of the cut.

5. The method as set forth in claim 4 further including the step of locating the tip of the torch at a predetermined height above the surface of the workpiece.

6. The method as set forth in claim 1 wherein a plurality of cutting torches are ganged and each of the preheating step initiating cutting step, rotating step and continuing said rotating step are serially performed by each cutting torch.

7. The method as set forth in claim 6 wherein the steps of translating and terminating are serially performed upon all of the cutting torches as a unit.

8. The method as set forth in claim 1 including the step of indexing the workpiece upon a platform.

9. The method as set forth in claim 8 including the step of transporting the cutting torch to locate the axis of the circular path of the cutting torch at a predetermined coordinate in the X and Y axis of the workpiece.

10. The method as set forth in claim 1 including the step of providing a first mixture of gas to the cutting torch to effect the step of preheating and a second mixture of gas to the cutting torch to effect the step of initiating cutting and maintaining cutting of the aperture.

11. A method for cutting a beveled aperture in a workpiece with a cutting torch, said method comprising the steps of:
   (a) setting the angle of the cutting torch with respect to the workpiece at an angle commensurate with the bevel angle of the aperture to be cut;
   (b) preheating the workpiece central to the aperture to be cut;
   (c) initiating cutting of the aperture by the cutting torch at a point within the perimeter of the aperture and maintaining cutting of the aperture until the perimeter of the aperture has been cut;

(d) translating the cutting torch rectilinearly for a specified distance;

(e) rotating the cutting torch about an axis of rotation, said rotating step being initiated commensurate with initiation of said translating step;

(f) terminating said translating step when the cutting torch has been translated the specified distance;

(g) maintaining the cutting torch radially aligned toward the center of the aperture to cut the bevel of the aperture; and (h) continuing said rotating step until the aperture has been cut.

12. The method as set forth in claim 11 including the step of positioning the cutting torch lateral to the axis of rotation of the cutting torch commensurate with radius of the aperture to be cut.

13. The method as set forth in claim 12 further including the step of adjusting the height of the cutting torch above the workpiece commensurate with the thickness of the workpiece, the size of the aperture to be cut and the bevel angle of the cut.

14. The method as set forth in claim 13 further including the step of locating the tip of the torch at a predetermined height above the surface of the workpiece.

15. The method as set forth in claim 11 wherein a plurality of cutting torches are ganged and each of the steps of preheating, initiating cutting, maintaining cutting rotating and continuing are serially performed by each cutting torch.

16. The method as set forth in claim 15 wherein the steps of translating and terminating are serially performed upon all of the cutting torches as a unit.

17. The method as set forth in claim 11 including the step of indexing the workpiece upon a platform.

18. The method as set forth in claim 17 including the step of transporting the cutting torch to locate the axis of rotation of the cutting torch at a predetermined coordinate in the X and Y axis of the workpiece.

19. The method as set forth in claim 11 including the step of providing a first mixture of gas to the cutting torch to effect the step of preheating and a second mixture of gas to the cutting torch to effect the step of initiating cutting and maintaining cutting of the aperture.

* * * * *